United States Patent [19]
Kitazaki et al.

[11] Patent Number: 6,141,173
[45] Date of Patent: Oct. 31, 2000

[54] HEAD MECHANISM CONTROL APPARATUS, DISK DRIVE UNIT, AND METHOD OF CONTROLLING HEAD UNLOAD

[75] Inventors: Nobuyuki Kitazaki, Fujisawa; Yoshiro Amano, Yokohama; Kenjo Ogasawara; Shinji Ueno, both of Fujisawa, all of Japan

[73] Assignee: International Business Machines Corporation, Armonk, N.Y.

[21] Appl. No.: 09/095,506

[22] Filed: Jun. 10, 1998

[30] Foreign Application Priority Data

Jun. 30, 1997 [JP] Japan ..................... 9-174435

[51] Int. Cl.⁷ .................................. G11B 21/02
[52] U.S. Cl. ............................... 360/75; 360/105
[58] Field of Search .................... 360/75, 105, 78.01, 360/78.04, 78.12, 72.1; 318/563, 368, 561

[56] References Cited

U.S. PATENT DOCUMENTS

6,025,968  2/2000  Albrecht ................... 360/78.04 X

*Primary Examiner*—Muhammad Edun
*Attorney, Agent, or Firm*—Noreen A. Krail; Robert B. Martin

[57] ABSTRACT

The present invention is an apparatus and method to reliably unload a head slider from a recording medium. Transistor Tr5 is on. If the main power supply Vdd is turned off at time t1, Tr1, Tr2, and D1 are turned off and the level of the control signal Ret becomes higher than the threshold voltage Vth of Tr3 and Tr4, turning on Tr3 and Tr4. C1 also starts to discharge. The control signal InRet changes to a "L"-level, and the control signal OutRet remains to be at the "L"-level. This allows the IR driver to feed a negative-polarity VCM current through the voice coil to preliminarily move the head arm in the direction opposite to the unload direction. Then, at time t2 when the level of Ret becomes equal to or lower than Vth, both InRet and OutRet change to a "H"-level, the IR driver becomes inoperative, and the OR driver feeds a positive-polarity VCM current through the voice coil to reverse the moving direction of the head arm.

13 Claims, 8 Drawing Sheets

HEAD MECHANISM CONTROL APPARATUS, DISK DRIVE UNIT, AND METHOD OF CONTROLLING HEAD UNLOAD

BACKGROUND OF THE INVENTION

1. Field of the Invention

The present invention relates to a head mechanism control apparatus which controls the load/unload operation of a head transducer from a recording medium, a disk drive unit using the head mechanism control apparatus, and an unload control method for a transducer head in a disk drive unit, and particularly to a head mechanism control apparatus which can reliably unload the transducer head.

2. Description of Related Art

In a disk drive unit, a head mechanism for supporting and moving a head slider having a transducer head may include a load/unload mechanism. The load/unload mechanism mounts a head arm having mounted thereon a head slider on a ramp provided in the vicinity of the inner periphery or the outer periphery of a disk. The load/unload mechanism unloads the head slider to a retract position outside the disk, and moves the head arm from the ramp to load the head slider over the disk. The head arm has mounted thereon a voice coil constituting a voice coil motor (VCM), for rotational movement of the head arm over the surface of the disk.

The load/unload mechanism climbs up the slope of the ramp while sliding in the unload direction to unload the head slider to the retract position, and it slides away from the ramp surface in the load direction to load the head slider over the disk. In addition, the load/unload mechanism does not intentionally bring the head slider into contact with the disk surface.

The head mechanism control apparatus for the load/unload mechanism controls the drive current (VCM current) that flows through the voice coil, thereby controlling the load/unload operation of the head slider. The loading of the head slider is performed when the main power supply of the disk drive unit is turned on, and when needed during the operation of the disk drive unit. The unloading of the head slider is carried out when the main power supply is turned off, and when needed during the operation of the disk drive unit.

Conventionally, the unloading of the head slider was performed by feeding a VCM current of a single polarity through the voice coil. The single polarity is the polarity for swinging the head arm in the unload direction, and it is the polarity opposite to the VCM current polarity for loading. Further, in the unloading when the main power is turned off (also called power off retract), the VCM current is generated from the counterelectromotive force of the spindle motor for rotating the disk. The spindle motor does not immediately stop the rotation if the main power is turned off, but it continues to rotate even after the main power supply is turned off mainly by the inertia of the disk for a while to generate the counterelectromotive force. The VCM current value in the power off retract depends on the magnitude of the above counterelectromotive force, and the magnitude of the counterelectromotive force depends mainly on the rotating speed of the spindle motor when the main power supply is turned off. Further, the time taken for the counterelectromotive force to become zero after the spindle motor stops the rotation depends mainly on the moment of inertia of the disk.

However, in the above conventional disk drive unit, there is a possibility that, if the unloading is initiated when the head arm is at a position on the disk outer diameter side which is near the ramp, the head arm cannot mount on the ramp overcoming the energy barrier by the slope of the ramp, and thus the unloading fails to be performed. This is because the distance for the head arm to approach the ramp after starting to swing in the unload direction on the disk is short, and thus it is not possible to ensure a sufficient kinetic energy for the head arm to overcome the above energy barrier. In particular, in the power off retract using the counterelectromotive force of the spindle motor, the above possibility is large because a large VCM current cannot be fed and the head arm cannot be accelerated with the short approaching distance. Further, in the power off retract, the lower the rotating speed of the spindle motor is when the main power supply is turned off, the higher the above possibility is.

The failure of unloading can lead to an accidental landing in which the head slider contacts with the disk surface. The disk surface is smoothed, and thus, if an accidental landing occurs, the head slider scratches the disk surface or sticks to the disk surface.

It therefore can be seen that there is a need in the art to provide a head mechanism control apparatus for a disk drive unit which can reliably unload the transducer head from a recording medium.

SUMMARY OF THE INVENTION

The present invention is to solve the problems of the background art, and its object is to provide a head mechanism control apparatus which can reliably unload the transducer head from a recording medium.

To accomplish the above object, the head mechanism control apparatus of the present invention is characterized in that, when the transducer head is unloaded, the head mechanism is controlled so as to preliminarily move the transducer head in the direction opposite to the unload direction and then unloads it while accelerating it in the unload direction. By this, the transducer head can reliably be unloaded overcoming the energy barrier, regardless of the position of the transducer head on the recording medium before unloading.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

Figure 1:
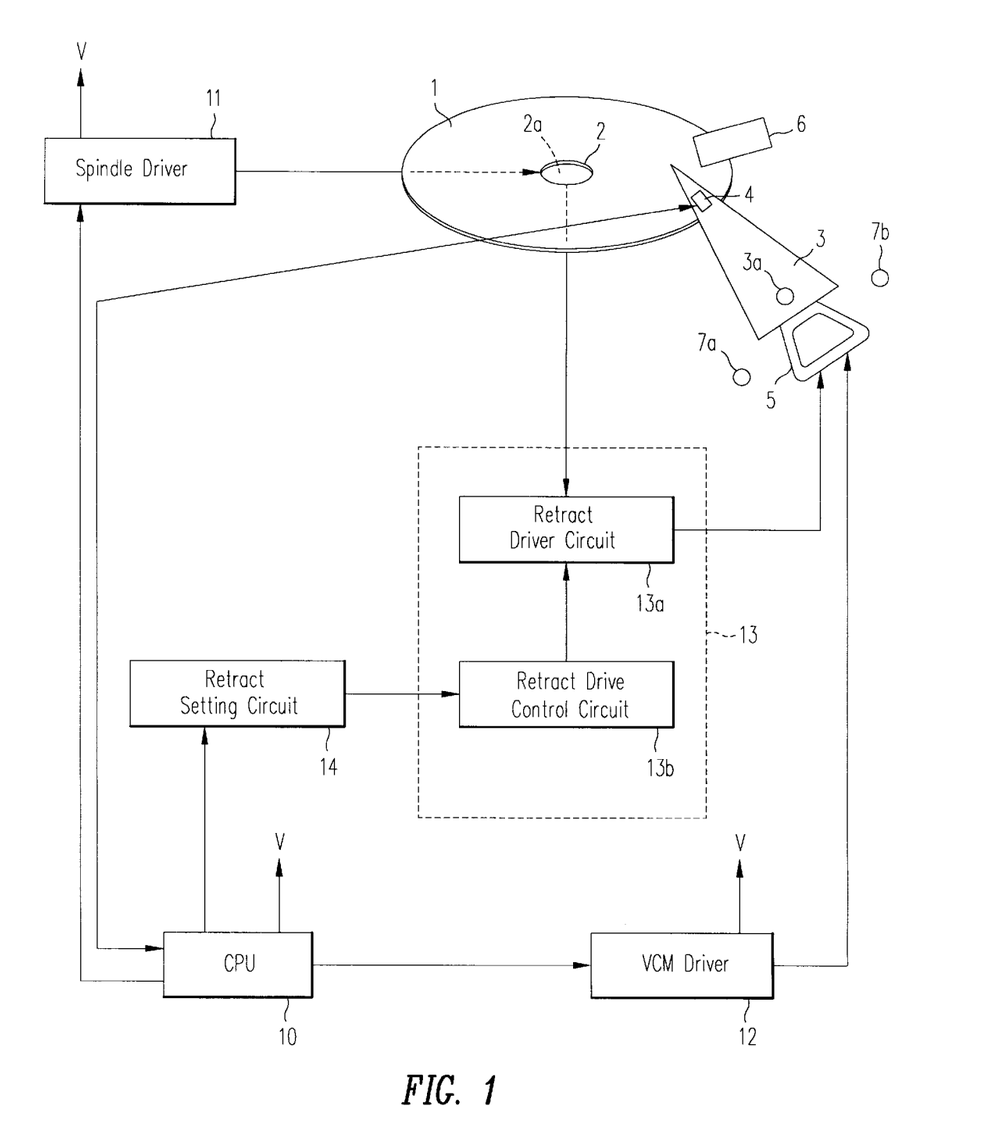
FIG. 1 is a simplified block diagram showing the construction of the disk drive unit according to the present invention.

FIG. 1 is a simplified block diagram showing a disk drive unit according to the present invention. The disk drive unit shown in FIG. 1 has a disk 1, a spindle motor 2, a head arm 3, a head slider 4, a voice coil 5, a ramp 6, crash stops 7(a) and 7(b), a CPU 10, a spindle driver 11, a voice coil motor (VCM) driver 12, a retract control circuit 13, and a retract setting circuit 14.

The disk 1, which is a data recording medium, is fixed to the spindle shaft 2a of the spindle motor 2. The spindle motor 2 rotates the disk 1. The head slider 4 having a transducer head for writing information to the disk 1 or reading out information from the disk 1, and the voice coil 5 are both mounted on the head arm 3. The head arm 3 swings around a pivot 3a. The voice coil 5 forms the VCM in conjunction with a permanent magnet, not shown. The VCM causes the head arm 3 to swing. The ramp 6 is to support the head arm 3 when the head arm 3 unloads the head slider 4 and the head arm 3 and the head slider 4 are at the retract position. The head arm 3, the VCM, and the ramp 6 form a load/unload mechanism for loading the head slider 4 over the disk 1 and unloading the head slider 4 from the disk 1. The crash stop is made up of an outer crash stop 7a and an inner crash stop 7b, and determines the swing range of the head arm 3.

The spindle driver 11 drives the spindle motor 2 according to the instruction from the CPU 10. The VCM driver 12 drives the VCM by feeding a drive current (VCM current) through the voice coil 5 according to the instruction from the CPU 10. The CPU 10, the spindle driver 11, and the VCM driver 12 operate when supplied with power from the main power supply Vdd of the disk drive unit, and stop the operation when the main power supply Vdd is turned off. The CPU 10 and the VCM driver 12 drive the VCM when the main power supply Vdd is on. That is, the CPU 10 and the VCM driver 12 perform the loading of the head slider 4, control the position of the head slider 4 during the disk operation in which the head slider 4 is over the disk 1, and perform the unloading of the head slider 4 when the disk operation is stopped. The retract control circuit 13 has a retract drive circuit 13a and a retract drive control circuit 13b. The retract control circuit 13 and the retract setting circuit 14 drive the VCM when the main power supply Vdd is turned off to perform the unloading of the head slider 4. That is, the retract control circuit 13 and the retract setting circuit 14 perform the power off retract.

The disk drive unit shown in FIG. 1 is characterized in that, to unload the head slider 4, the head arm 3 is controlled so as to preliminarily move the head slider 4 in the direction opposite to the unload direction (in the load direction) and then acceleratedly move it in the unload direction for unloading from the disk 1. That is, the head arm 3 is preliminarily moved in the direction opposite to the unload direction (in the load direction) and then acceleratedly moved in the unload direction to mount on the ramp 6. Since the above preliminary movement ensures an approaching distance which can supply the head arm 3 with a kinetic energy necessary for overcoming the energy barrier due to the ramp 6, even if the head arm 3 is at a position near the ramp 6 when the unloading is started, the head slider 4 can reliably be unloaded to the retract position regardless of the position of the head arm 3 when the unloading is started.

The CPU 10, the VCM driver 12, the retract control circuit 13, and the retract setting circuit 14 form a head mechanism control apparatus for controlling the operation of the load/unload mechanism. Further, the CPU 10 and the spindle driver 11 constitute a spindle motor controller for controlling the operation of the spindle motor 2. The head mechanism control apparatus has a means for performing the loading of the head slider 4, a means for controlling the position of the head slider 4 during the disk operation, a means for performing the unloading of the head slider 4 to stop the disk operation, and a means for performing the unloading of the head slider 4 when the main power supply is turned off.

Figure 2A:
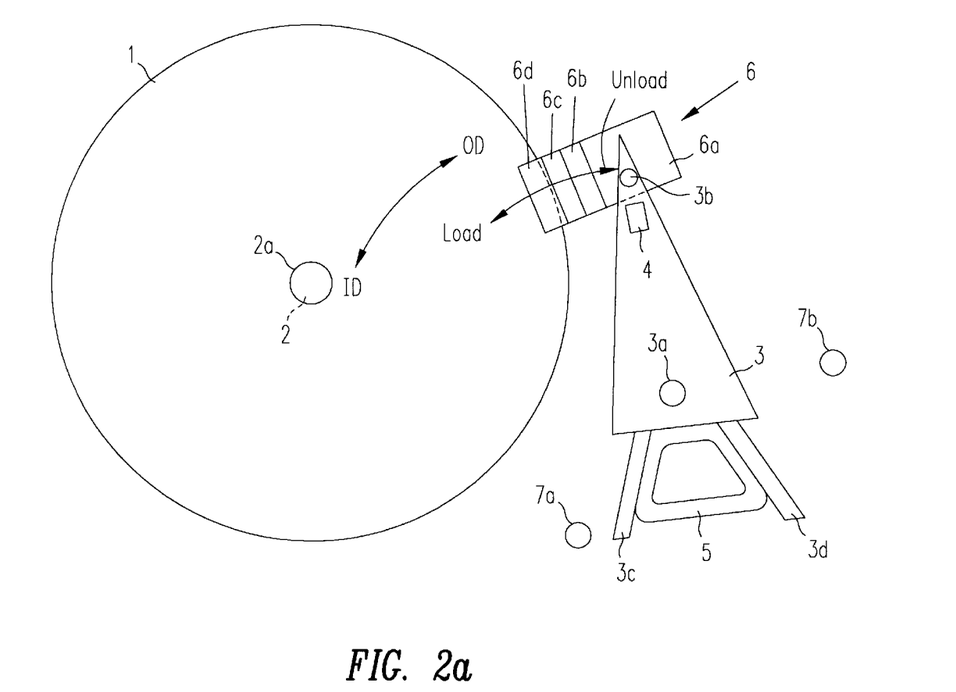
FIGS. 2(a) and 2(b) are diagrams showing the construction of the load/unload mechanism in the disk drive unit of according to the present invention.
Figure 2B:
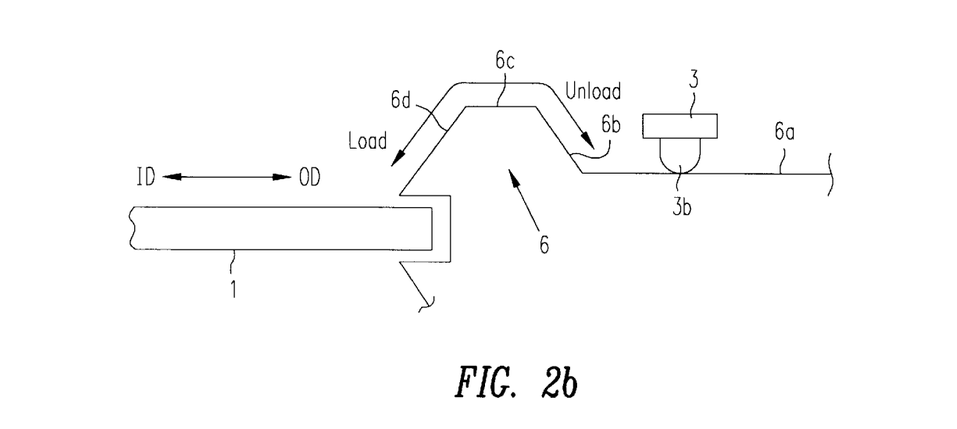

FIGS. 2(a) and 2(b) are figures showing the construction of the loading/unloading, in which FIG. 2(a) is a top view and FIG. 2(b) is a sectional view including a projecting portion 3b formed in the head arm 3 and the ramp 6. The head arm 3 is caused to swing about the pivot 3a by passing the VCM current through the voice coil 5. In FIG. 2(a), the clockwise swing direction is the unload direction, and the counterclockwise swing direction is the load direction. Specifically, the unload direction on the disk 1 is called the outer diameter direction (OD direction), and the load direction is called the inner diameter direction (ID direction). FIG. 2(a) is a figure when the head slider 4 and the head arm 3 are at the retract position. The ramp 6 has a parking surface 6a, a slope 6b, a top surface 6c, and a slope 6d. When the head slider 4 and the head arm 3 are at the retract position, the projecting portion 3b formed in the head arm 3 is in contact with the parking surface 6a of the ramp 6. Further, the coil supporting portion 3c of the head arm 3 is in contact with or very close to the crash stop 7a. The crash stop 7a is to define the swing range of the head arm 3 on the unload direction side.

Figure 3A:
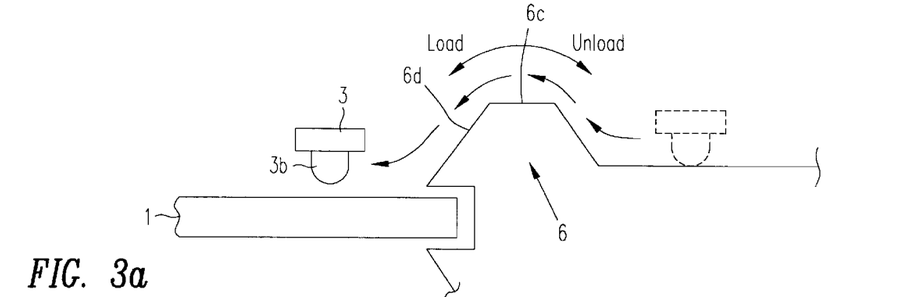
FIGS. 3(a)–3(d) are illustrations for explaining the operation of the load/unload mechanism in the disk drive unit according to the present invention.
Figure 3B:
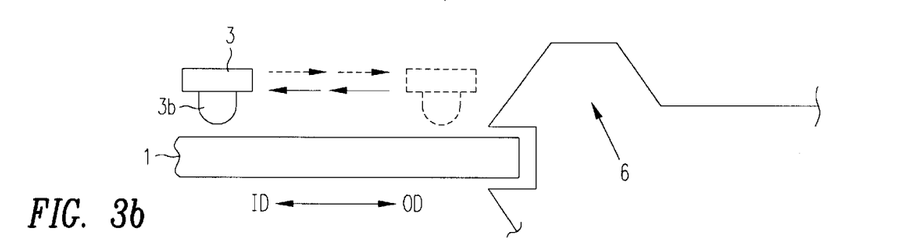
Figure 3C:
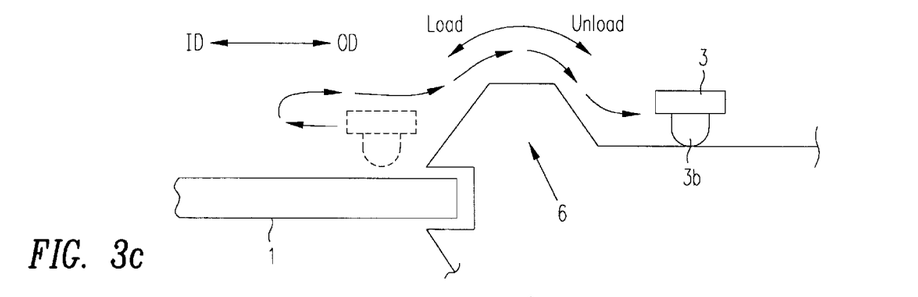
Figure 3D:
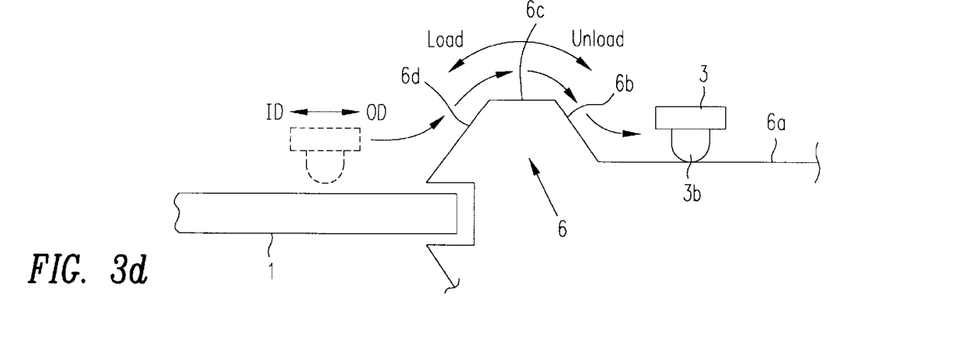

FIGS. 3(a)–3(d) are figures for explaining the operations of the load/unload mechanism in the loading/unloading and the disk operation, in which FIG. 3(a) is the operation for the loading, FIG. 3(b) is the operation during the disk operation, FIG. 3(c) is the operation for the unloading by the preliminary movement, and FIG. 3(d) is the operation for the conventional unloading without the preliminary movement. For the loading, FIG. 3(a) shows the head arm 3 swings in the load direction to cause the head slider 4 to enter onto the rotating disk 1 (over the disk 1). In this operation, the projecting portion 3b of the head arm slides on the surface of the ramp 6 in the load direction and leaves the slope 6d, as shown in FIG. 3(a). In the disk operation, the head arm 3 swings on the disk 1 in the ID direction and the OD direction to move the head slider 4, as shown in FIG. 3(b). In addition, the crash stop 7b shown in FIG. 2(a) abuts on the coil supporting portion 3d of the head arm 3 to determine the swing range of the head arm of the ID direction side.

Then, for the unloading by the preliminary movement shown in FIG. 3(c), the head arm 3 first preliminarily moves in the ID direction, thereafter the moving direction is reversed, and the head arm 3 acceleratedly moves in the OD direction (unload direction) to unload the head slider 4 from the disk 1 to the retract position. In this operation, as shown in FIG. 3(c), the head arm's projecting portion 3b contacts with the slope 6*d* of the ramp 6, climbs up the slope 6*d* in the unload direction, then slides on the top surface 6*c* and the slope 6*b*, and reaches the parking surface 6*a*. Lastly, for the conventional unloading without the preliminary movement, the head arm 3 swings in the OD direction (unload direction), as shown in FIG. 3(*d*), to unload the head slider 4 from the disk 1 to the retract position.

Figure 4:
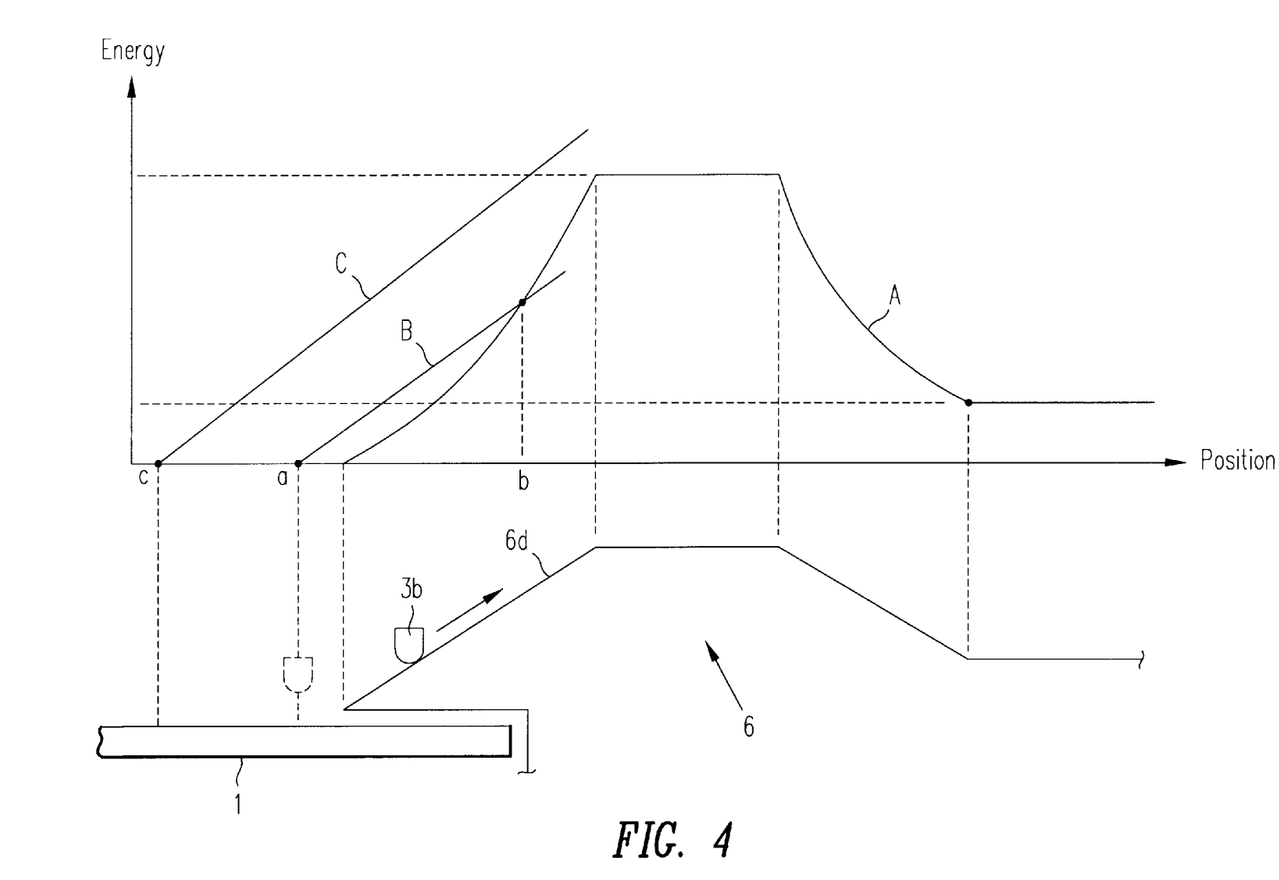
FIG. 4 is a graph for explaining the energy barrier in unloading, and the difference between the conventional unloading and the unloading by the preliminary movement in the disk drive unit according to the present invention.

In the unloading, a frictional force acts between the head arm's projecting portion 3*b* and the ramp 6 surface, and an energy barrier is generated by the frictional force. If the head arm 3 has not a kinetic energy larger than the energy barrier, it cannot return to the retract position. The graph shown in FIG. 4 represents the energy barrier generated at the passing position of the head arm's projecting portion 3*b* in the unloading. The energy barrier A represents a kinetic energy which causes the head arm's projecting portion 3*b* to be unable to pass that position in the unloading. Accordingly, if a kinetic energy exceeding the energy barrier A is provided to the head arm 3 by the VCM for unloading, the head arm 3 can reach the retract position beyond the slope of the ramp 6. In other words, if the drive force in the unload direction which is given by the VCM to the head arm 3 always exceeds the frictional force acting in the load direction, the head arm 3 can reach the retract position.

However, if the conventional unloading described in FIG. 3(*d*) is performed when the head arm 3 is at a position near the ramp 6, there is a possibility that the head arm 3 cannot overcome the energy barrier by the ramp 6 and fails to be unloaded, as described above. B shown in FIG. 4 represents the kinetic energy which is given by the VCM to the head arm 3 if the conventional unloading is performed when the head arm's projecting portion 3*b* is at a position a on the disk, which is close to the ramp 6. When the unloading is initiated, the kinetic energy of the head arm 3 equals to the energy barrier at a position b in the middle of the slope 6*a* of the ramp 6, that is, the drive force balances with the frictional force and thus the head arm's projecting portion 3*b* cannot go over the slope 6*a*.

Specifically, for the power off unloading, since the VCM current is generated from the counterelectromotive force generated by the spindle motor 2, the VCM current cannot be made large to largely accelerate the head arm 3. Thus, since the gradient of A shown in FIG. 4 cannot be made large, the unloading can fail. Since the level of the above counterelectromotive force becomes smaller as the rotating speed of the spindle motor 2 decreases, the possibility of the unload failure increases if the main power supply Vdd is turned off during a LOW-RPM operation such as a LOW-RPM reading or LOW-RPM burnish. The LOW-RPM burnish is a process in which the rotating speed of the spindle is made lower than usual to decrease the flying height of the head slider 4, thereby for removing the protrusions on the disk 1 surface. Further, the LOW-RPM reading is a process in which the flying height of the head slider 4 is made smaller for reading/writing data. The preset rotating speed of the spindle motor 2 in the LOW-RPM operation is 2000 to 3000 [rpm] for instance. On the other hand, the preset rotating speed of the spindle motor 2 in the normal disk operation is about 4000 [rpm] for instance.

As described in FIG. 3(*c*), the above unload failure can be avoided if the head arm 3 is preliminarily moved in the ID direction to ensure an approaching distance enough for providing the head arm 3 with a kinetic energy necessary for overcoming the energy barrier by the ramp 6. C shown in FIG. 4 represents the kinetic energy given to the head arm 3 by the VCM if the unloading by the preliminary movement is initiated when the head arm's projecting portion 3*b* is at position a. When the unloading is started, the head arm's projecting portion 3*b* preliminarily moves to a position c farther from the ramp 6 than the position a. Then, it acceleratedly moves from the position c in the unload direction. That is, it starts an approach run from the position c. By this, the kinetic energy C of the head arm 3 on the slope 6*d* is made larger than that (A in the figure) provided when no preliminary movement is performed, and thus the head arm's projecting portion 3*b* can go over the slope 6*d*.

Now, description is made to the control of the load/unload mechanism in the unloading when the main power supply is turned off. The head mechanism control apparatus for controlling the load/unload mechanism has, as means for performing the unloading when the main power supply is turned off, a first setting means to be put in a first setting or a second setting; a first judging means for judging whether or not to perform the preliminary movement, and to perform the preliminary movement, putting the first setting means in the first setting, otherwise in the second setting; and a first unload control means for performing the unloading including the preliminary movement when the first setting means is in the first setting, and performing no preliminary movement when the first setting means is in the second setting. The first unload control means has a first driver means for driving the load/unload mechanism, and a first drive control means for controlling the first driver means. In this embodiment, referring back to FIG. 1, the first setting means is the retract setting circuit 14, and the first unload control means is the retract control circuit 13. The first driver means is the retract driver circuit 13*a*, and the first drive control means is the retract drive control circuit 13*b*. Further, the first judging means exists in the CPU 10, and it is based, for instance, on microcode stored in the memory device within the CPU 10.

Figure 5:
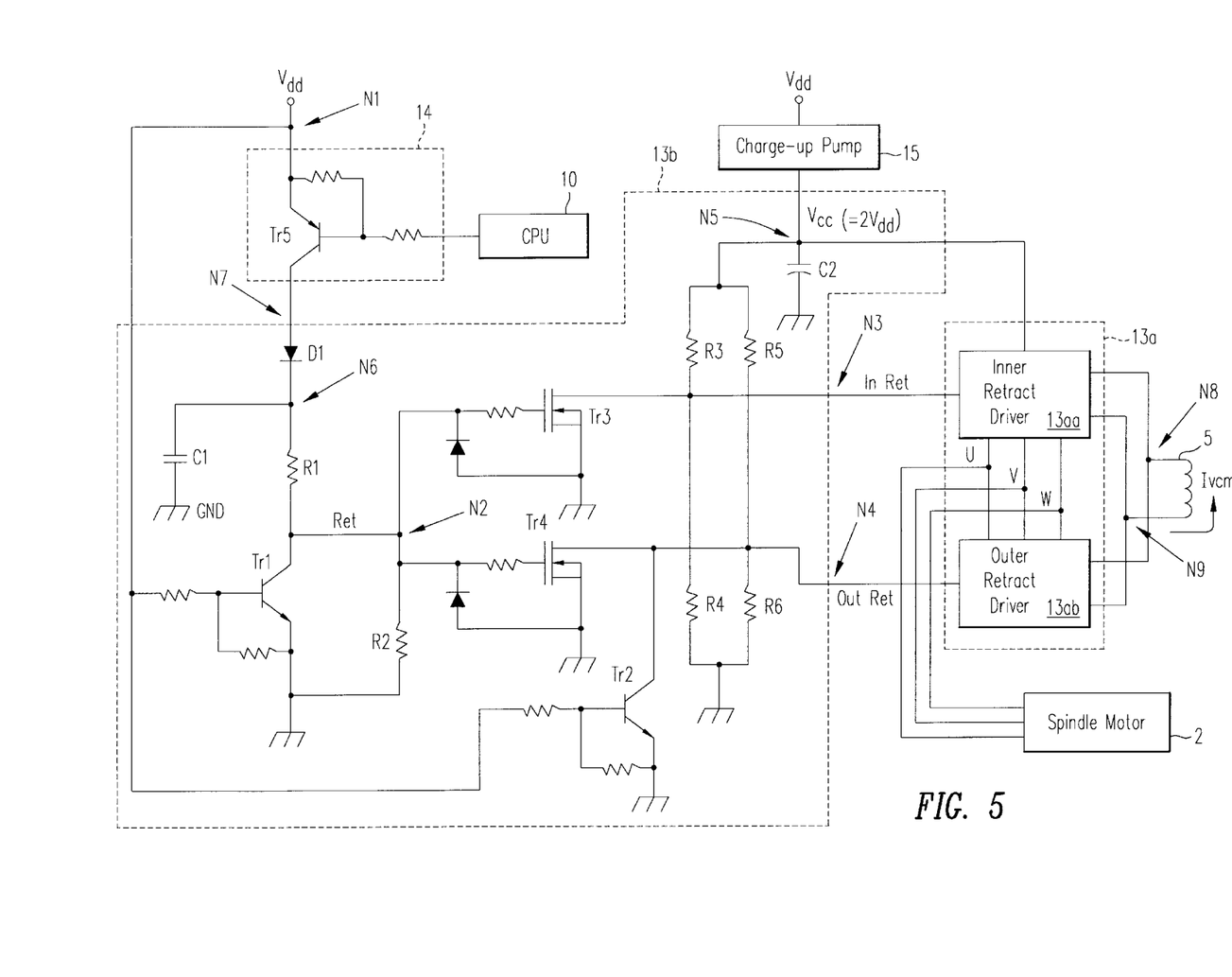
FIG. 5 is a circuit diagram showing the internal constructions of the retract control circuit and the retract setting circuit in the disk drive unit according to the present invention.

FIG. 5 is a diagram showing the internal construction of the retract control circuit 13 and the retract setting circuit 14. The retract setting circuit 14 has a pnp transistor Tr5. The emitter electrode of the transistor Tr5 is connected to a node N1 (main power supply Vdd), the base electrode of Tr5 is connected to the first judging means in the CPU 10 through a bias resistor, and the collector electrode of Tr5 is connected to a node N7. The retract setting circuit 14 is in the first setting when Tr5 is on, and in the second setting when Tr5 is off. The main power supply Vdd is 5 [V] for instance.

The retract drive control circuit 13*b* has npn transistors Tr1 and Tr2, n-channel transistors Tr3 and Tr4, resistors R1 to R6, capacitors C1 and C2, and a diode D1. The collector electrode of the transistor Tr1 is connected to a node N2, and the collector electrode of the transistor Tr2 is connected to a node N4. Further, the base electrodes of Tr1 and Tr2 are connected to the node N1 through a bias resistor, respectively, and the emitter electrodes of Tr1 and Tr2 are grounded. The transistors Tr1 and Tr2 are on when the main power supply Vdd is on, and they are turned off when the main power supply Vdd is turned off.

The capacitor C1 is provided between a node N6 and a ground power supply GND, the resistor R1 is provided between the node N6 and the node N2, and the register R2 is provided between the node N2 and the ground power supply GND. The anode electrode of the diode D1 is connected to the node N7 (the collector electrode of Tr5), and the cathode electrode is connected to the node N6. The capacitor C1 and the resistors R1 and R2 form a time constant circuit which operates when the main power supply Vdd is turned off. The capacitance value of C1 and the resistance values of R1 and R2 are, for instance, C1=0.56 [æF], R1=10 [kΩ], and R2=13 [kΩ]. At the node N2, a control signal Ret is generated.

The drain electrode of the transistor Tr3 is connected to a node N3, and the drain electrode of the transistor Tr4 is connected to a node N4. Further, the gate electrodes of Tr3 and Tr4 are respectively connected to the node N2 through a bias resistor, and the source electrodes of Tr3 and Tr4 are grounded. The transistors Tr3 and Tr4 are turned on when the control signal Ret becomes a "H"-level (the Vdd level when it is on), and turned off when the control signal Ret becomes an "L"-level (GND level).

The capacitor C2 is provided between a node N5 and the ground power supply GND. A charge-up pump 15 generates a voltage Vcc of a level as two times high as the main power supply Vdd from Vdd. The capacitor C2 is charged to the voltage Vcc by the charge-up pump connected to the node N5. The capacitance value of the capacitor C2 is 0.68 [æF] for instance. The resistor R3 is provided between the node N5 and the node N3, and the resistor R4 is provided between the node N3 and the ground power supply GND. Further, the resistor R5 is provided between the node N5 and the node N4, and the resistor R6 is provided between the node N4 and the ground power supply GND. The values of the resistors R3 to R6 are, for instance, all equal, or 4.7 [kΩ]. The node N3 generates a control signal InRet, and the node N4 generates a control signal OutRet. The control signal InRet becomes the "H"-level when the transistor Tr3 is off, and the "L"-level when on. Further, the control signal OutRet becomes the "H"-level when the transistors Tr2 and Tr4 are both off, and the "L"-level when any of Tr2 and Tr4 is on.

The retract driver circuit 13a has an inner retract driver (IR driver) 13aa and an outer retract driver (OR driver) 13ab. The IR driver 13aa operates when the control signal InRet is at the "L"-level, thereby to feed a VCM current Ivcm of a negative polarity through the voice coil 5 for swinging the head arm 3 in the ID direction. Further, the OR driver 13ab operates when the control signal Outret is at the "HI"-level, thereby to feed a VCM current Ivcm of a positive polarity through the voice coil 5 for swinging the head arm 3 in the OD direction (unload direction).

Figure 6:
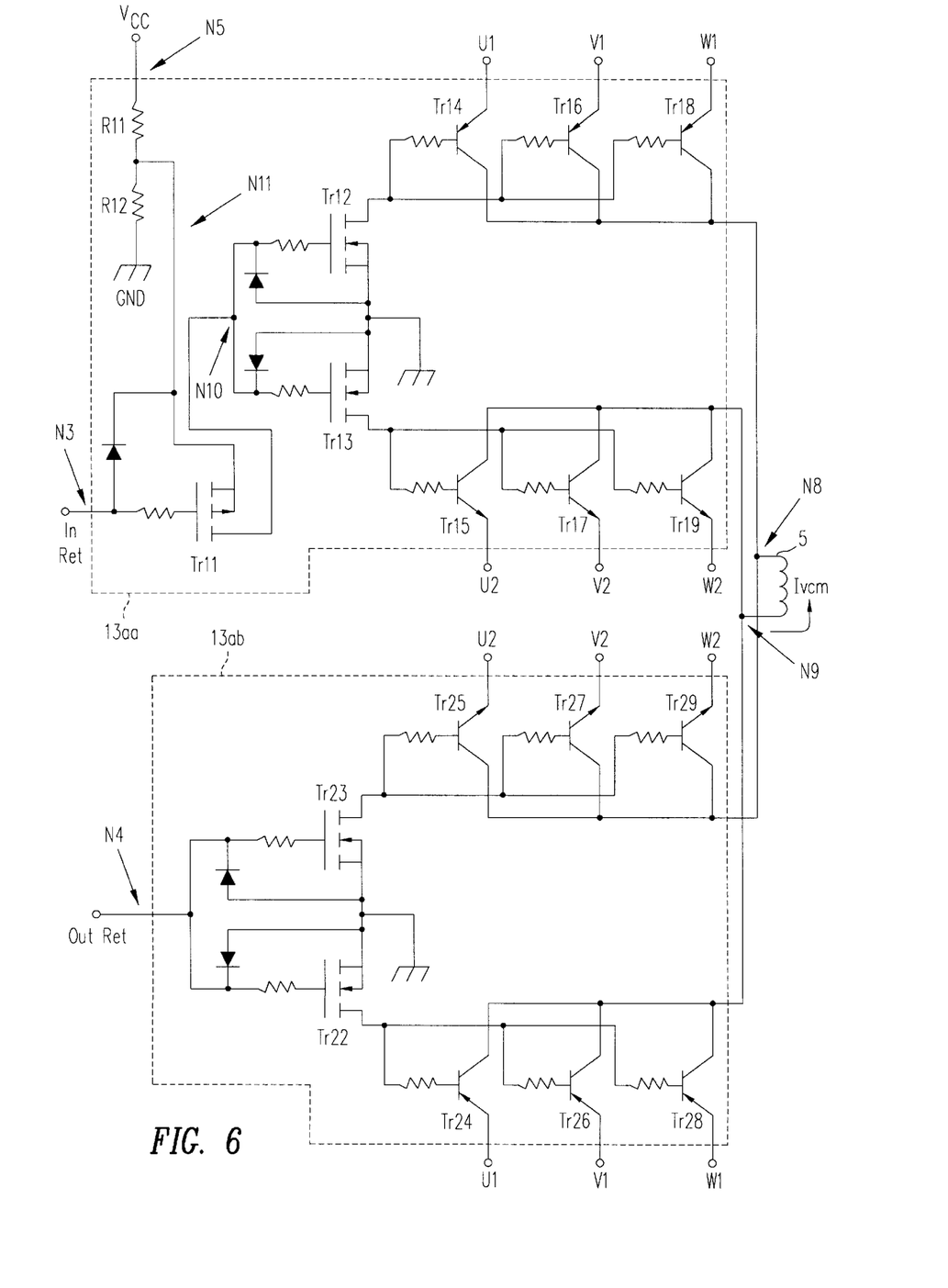
FIG. 6 is a circuit diagram showing the internal construction of the retract driver circuit in the disk drive unit according to the present invention.

FIG. 6 is a diagram showing the internal construction of the retract driver circuit 13a. The OR driver 13ab has n-channel transistors Tr22 and Tr23, pnp transistors Tr24, Tr26, and Tr28, and npn transistors Tr25, Tr27, and Tr29. The common gate electrode of the transistors Tr22 and Tr23 is connected to the node N4 at which the control signal OutRet is generated, and the common source electrode of the Tr22 and Tr23 is grounded. The base electrodes of the transistors Tr24, Tr26, and Tr28 are commonly connected to the drain electrode of Tr22, and the base electrodes of the transistors Tr25, Tr27, and Tr29 are commonly connected to the drain electrode of Tr23. The collector electrodes of Tr24, Tr26, and Tr28 are commonly connected to the node N9 (the first terminal of the voice coil 5), and the collector electrodes of Tr25, Tr27, and Tr29 are commonly connected to the node N8 (the second terminal of the voice coil 5). Further, to the emitter electrodes of the transistors Tr24 to Tr29, the counterelectromotive force by the spindle driver 2, or a three-phase a.c. voltage consisting of a U-phase, V-phase, and W-phase is applied. For instance, the emitter electrode of the transistor Tr24 is connected to the U1 terminal of the U-phase, the emitter electrode of the transistor Tr25 is connected to the U2 terminal of the U-phase, and the U-phase is applied between the emitter electrodes of Tr24 and Tr25.

The transistors Tr22 and Tr23 are off when the control signal OutRet is at the "L"-level, and on when at the "H"-level. The terminal U1 becomes a positive potential when Tr22 and Tr23 are on, and Tr24 and Tr25 are turned on when the terminal U2 becomes a negative potential, thereby to feed the VCM current Ivcm of a positive polarity through the terminal U2 from the terminal U1 via the node N9, voice coil 5, and node N8. The transistors Tr26 to Tr29 also operate in a manner similar to Tr24 and Tr25.

The IR driver 13aa has a p-channel transistor Tr11, n-channel transistors Tr12 and Tr13, pnp transistors Tr14, Tr16, and Tr18, npn transistors Tr15, Tr17, and Tr19, and resistors R11 and R12. The transistors Tr12 to Tr19 correspond to the transistors Tr22 to Tr29 of the OR driver 13ab, respectively. The IR driver 13aa has a construction in which the transistor Tr11 and the dividing resistors R11 and R12 are provided in the OR driver 13ab. The drain electrode of the transistor Tr11 is connected to a node N10 (the common gate electrode of Tr12 and Tr13), the gate electrode of Tr11 is connected to the node N3 at which the control signal InRet is generated, and the source electrode of Tr11 is connected to a node N11. The collector electrodes of the transistors Tr14, Tr16, and Tr18 are commonly connected to the node N8, and the collector electrodes of the transistors Tr15, Tr17, and Tr19 are commonly connected to the node N9. The dividing resistor R11 is provided between the node N5 at the Vcc level and the node N11, and the dividing resistor R12 is provided between the node N11 and the ground power supply GND. The series resistance value of the dividing resistors R11 and R12 is set so as to be larger than the composite resistance value of the resistors R3 to R6 in FIG. 5. Further, the dividing resistors R11 and R12 are provided with the same resistance value so that the node N10 is at the "H"-level (Vcc/2 level).

The transistor Tr11 is off when the control signal InRet is at the "H"-level, and it is turned on when the control signal InRet becomes the "L"-level. The transistors Tr 12 and Tr 13 are off when the Tr 11 is off, and they are turned on when the transistor Tr 11 is on. When the transistors Tr22 and Tr23 are on, the transistors Tr14 to Tr18 feed the VCM current of a negative polarity Ircm through the terminals U2, V2, and W2 from the terminals U1, V1, and W1 via the node N8, voice coil 5, and node N9.

Figure 7:
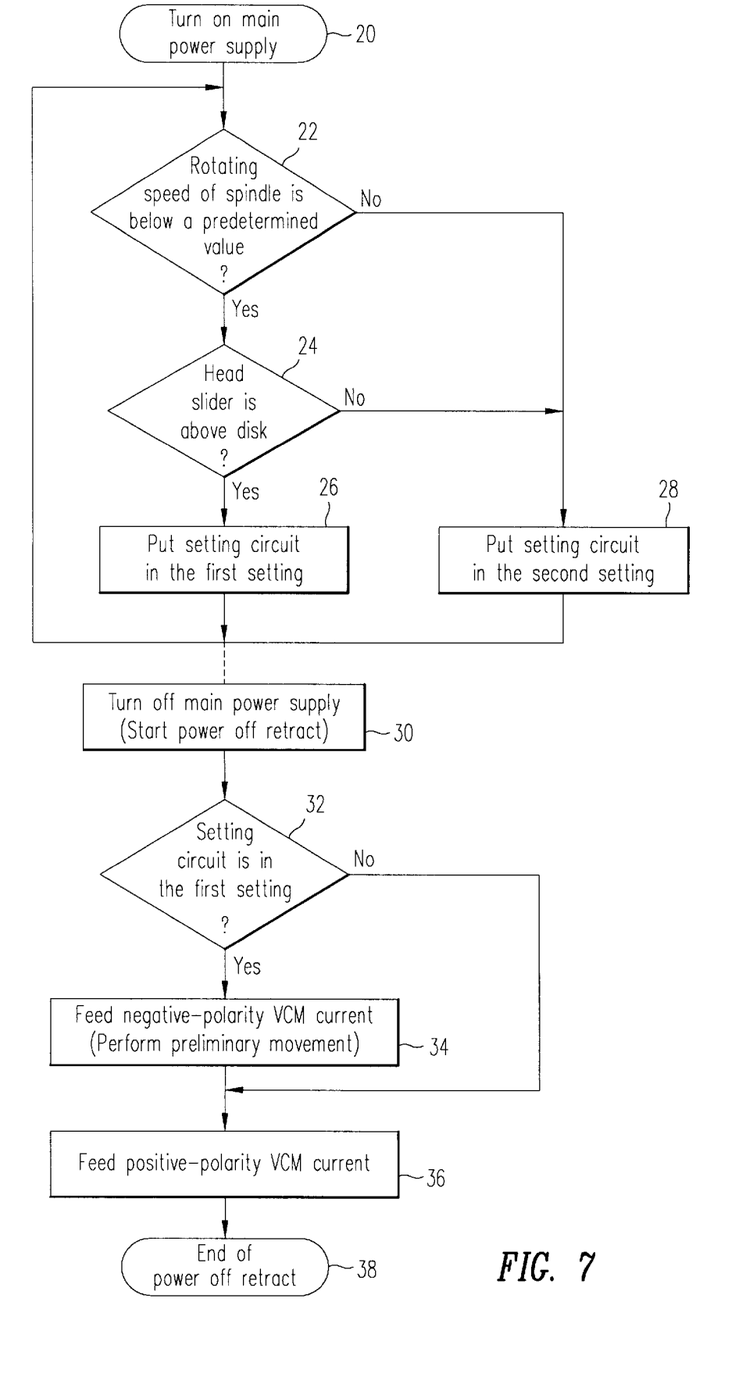
FIG. 7 is a flowchart showing the power off retract sequences in the disk drive unit according to the present invention.

FIG. 7 is a flowchart showing the power off retract sequence in the disk drive unit shown in FIG. 1. When the main power supply Vdd is turned on in step 20 to activate the disk drive unit, the first judging means in the CPU 10 judges in steps 22 and 24 whether or not to perform the preliminary movement for power off retract, and to perform the preliminary movement, it turns on the transistor Tr5 of the retract setting circuit 14 in step 26 to put the retract setting circuit 14 in the first setting, otherwise it turns off the transistor Tr5 in step 28 to put the retract setting circuit 14 in the second setting. Further, the loop of steps 22 to 28 is repeated as needed, thereby to change the setting of the retract setting circuit 14.

In this process, the first judging means judges whether or not to perform the preliminary movement, based on the rotating speed of the spindle motor 2 and whether the head slider 4 is loaded or unloaded (whether the head arm 3 is lying over the disk 1 or mounting on the ramp 6), and it puts the retract setting circuit 14 in the first setting only when the rotating speed of the spindle motor 2 is lower than a predetermined value and the head slider 4 is loaded over the disk 1.

That is, the process goes to step 24 if the rotating speed of the spindle motor 2 is lower than a predetermined value in step 22, and goes to step 28 if it exceeds the predetermined value. For instance, the process goes to step 24 if it is the rotating speed for the LOW-RPM operation, and goes to step 28 if it is the rotating speed for the normal disk operation. The rotating speed of the spindle motor 2 can be known by detecting the rotating speed set by the spindle motor control unit for instance. Then, in step 24, the process goes to step 26 if the head slider 4 is loaded over the disk 1, and goes to step 28 if the head slider 4 is not loaded over the disk 1, and goes to step 28 if the head slider 4 is not loaded over disk 1. The case in which the head slider 4 is not loaded over the disk 1, specifically means the case in which the head slider 4 is unloaded by the stopping of the disk operation and the head arm 3 is mounting on the ramp 6. If the preliminary movement is performed when the head arm 3 is on the ramp 6, the head arm 3 can fall from the ramp 6 to cause the head slider 4 to contact with the disk 1 surface, and thus step 5 is provided to avoid this. Whether or not the head slider 4 is above disk 1 is recognized by the head mechanism control apparatus itself.

In addition, step 22 is provided based on the fact that the possibility of the power off retract failure increases as the rotating speed of the spindle motor 2 decreases, and the preliminary movement may be performed independently of the rotating speed of the spindle motor 2. Further, in step 28, the preliminary movement may be performed only when the head slider 4 is in a predetermined area on the disk 1 on the outer diameter side. The position of the head slider 4 on the disk 1 can be known by the servo information which the head slider 4 reads from the disk 1 into the CPU 10.

Then, in step 30, if the main power Vdd is turned off, the retract control circuit 13 performs the power off retract in steps 32 to 36. That is, if the retract setting circuit 14 is in the first setting in step 32, the VCM current of a negative polarity is fed through the voice coil 5 in step 34 simultaneously with the turn-off of the main power supply Vdd, thereby to perform the preliminary movement, and then, in step 36, the VCM current is reversed to a positive polarity to mount the head arm 3 on the ramp 6 and unload the head slider 4 to the retract position, and in step 38, the power off retract sequence is completed.

Figure 8A:
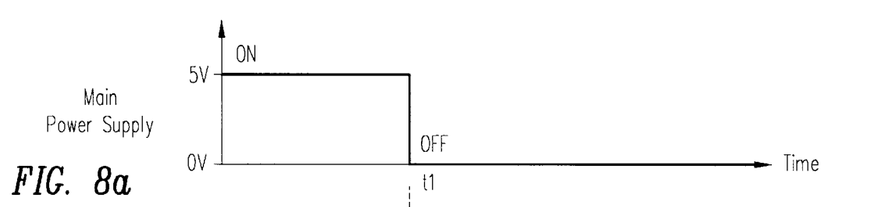
FIGS. 8(a)–8(e) are time charts showing the operation of the retract control circuit when the retract setting circuit is in the first setting in the disk drive unit according to the present invention.
Figure 8B:
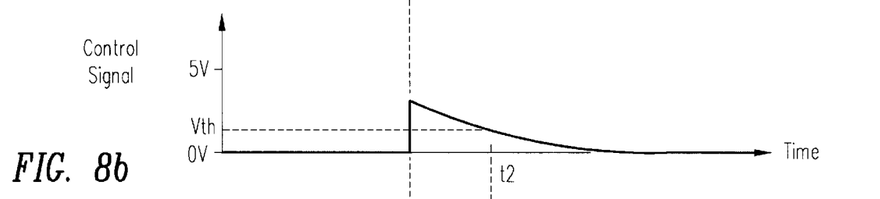
Figure 8C:
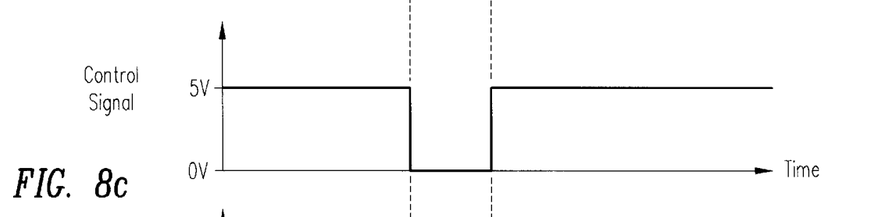
Figure 8D:
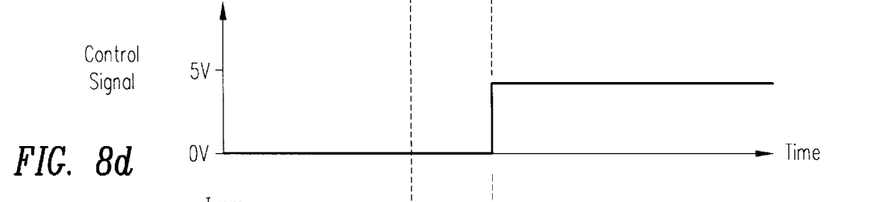
Figure 8E:
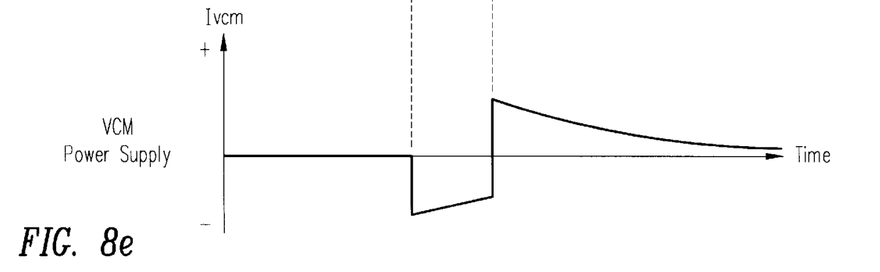

FIGS. 8(a)–8(e) are time charts showing the operation of the retract control circuit 13 when the retract setting circuit 14 is in the first setting, in which FIG. 8(a) shows the voltage profile of the main power supply Vdd, FIG. 8(b), FIG. 8(c), and FIG. 8(d) show the voltage profiles of the control signals Ret, InRet, and OutRet, respectively, and FIG. 8(e) shows the VCM current profile.

During the period before time t1 over which the main power Vdd is on, the transistor Tr5 of the retract setting circuit 14 is on according to the first setting, and thus the diode D1 is on and the capacitor C1 is charged by the main power supply Vdd. Further, the transistors Tr1 and Tr2 are on, and the transistors Tr3 and Tr4 are off. The control signals Ret and OutRet are at the "L"-level, and the control signal InRet is at the "H"-level. Accordingly, the IR driver 13aa and the OR driver 13ab are both inoperative.

At time t1, when the main power supply Vdd is turned off (the voltage decreases from 5 [V] to 0 [V]), the transistors Tr1 and Tr2 and the diode D1 are turned off. The turn-off of Tr1 causes the voltage level of the control signal Ret to become higher than the threshold voltage Vth of the transistors Tr3 and Tr4, whereby Tr3 and Tr4 are turned on. Further, the turn-off of the diode D1 and the transistor Tr1 causes the capacitor C1 to start to discharge through the resistors R1 and R2, whereby the voltage level of the control signal Ret is gradually decreased. The turn-on of the transistor Tr3 causes the control signal InRet to change from the "H"-level (5 [V]) to the "L"-level (0 [V]). Since the transistor for connecting the node N4 to the ground power supply GND was only changed from Tr2 to Tr4, the control signal OutRet remains to be the "L"-level. When the control signal InRet changes to the "H"-level, the transistors Tr11 to Tr13 of the IR driver 13aa are turned on, and the IR driver 13aa feeds the VCM current of a negative polarity through the voice coil 5 for the time period from time t1 to time t2, thereby to preliminarily move the head arm 3 in the ID direction. By this, the head arm 3 can acquire the approaching distance necessary for moving over the slope 6d of the ramp 6.

Then, at time t2, since the voltage level of the control signal Ret becomes lower than the threshold value Vth, the transistors Tr3 and Tr4 are turn off. As a result, the control signals In Ret and OutRet both change from the "L"-level to the "H"-level. When the control signal InRet changes to the "H"-level, the IR driver 13aa stops the feeding of the negative-polarity VCM current. Further, the transistors Tr22 and Tr23 of the OR driver 13ab are turned on, and the OR driver 13ab feeds the positive-polarity VCM current through the voice coil 5 from time t2 until the spindle motor 2 stops the rotation and its counterelectromotive force is not supplied. This allows the polarity of the VCM current to be reversed from negative to positive, and the head arm 3 acceleratedly moves in the OD direction, climbs up the slope 6d of the ramp 6, and slides on the ramp 6 surface in the unload direction to unload the head slider 4 to the retract position.

In addition, the time period (from time t1 to time t2) during which the negative-polarity VCM current is fed may be set by the capacitor C1 and the resistors R1 and R2 so that it is the time period which ensures the approaching distance necessary for the head arm 3 at a position on the disk 1 nearest to the ramp 6 to move over the slope 6d of the ramp 6. The time period for feeding the negative-polarity VCM current is, for instance, 20 to 30 [msec.]. Further, the time period for feeding the negative-and positive-polarity VCM currents (the time until the supplying of the counterelectromotive force is stopped) is, for instance, 300 [msec].

Returning to FIG. 7, if the retract setting circuit 14 is in the second setting in step 32, the main power supply Vdd is turned off, and the positive-polarity VCM current is fed through the voice coil 5 in step 36. That is, since the transistor Tr5 of the retract setting circuit 14 is turned off by the second setting, the capacitor C1 is not charged. Accordingly, even if the main power supply Vdd is turned off, the control signal Ret remains to be at the "L"-level and the transistor Tr3 is still off, and thus the IR driver 13aa does not operate. Further, since the transistor Tr4 remains to be off, the OR driver 13ab starts to operate when the main power supply Vdd is turned off and the transistor Tr2 is turned off. This allows the unloading without the preliminary movement to be performed.

Now, description is made to the control of the load/unload mechanism in the unloading for stopping the disk operation. The head mechanism control apparatus has, as means for performing the unloading for stopping the disk operation, a second setting means having a function similar to the first setting means, a second judging means having a function similar to the first judging means, and a second unload control means having a function similar to the first judging means. The second unload control means has a second driver means for driving and the load/unload mechanism, and a second drive control means for driving the second driver means. In this embodiment, the second setting means, second judging means, and second drive control means are in the CPU 10. The second setting means is, for instance, a one-bit register in the CPU 10. The second judging means and the second drive control means are based, for instance, on a microcode stored in the memory device in the CPU 10. Further, the second driver means is the VCM driver 12 in this example.

Although the internal construction of the VCM driver 12 is basically similar to the retract driver circuit 13a, the VCM current is generated from the main power supply Vdd rather than the counterelectromotive force of the spindle motor 2. Further, the second drive control means can control the polarity and value of the VCM current. Accordingly, in the unloading for stopping the disk operation, the VCM current of a predetermined value can be fed regardless of the rotating speed of the spindle motor 2, and it may be considered that the occurrence of the unload failure depends only on the distance for approaching the ramp 6. Furthermore, when the disk operation is stopped, the head slider 4 always stay over the disk 1. Thus, for the judgment as to whether or not to perform the preliminary movement, the second judging means need not consider the rotating speed of the spindle motor 2 and whether or not the head arm 3 is mounting on the ramp. In this embodiment, the second judging means puts the second setting means in the first setting when the position of the head arm 3 on the disk 1 cannot ensure a predetermined distance for approaching the ramp 6, that is, when the head slider 4 is in a predetermined doughnut-like area on the outer diameter side of the disk 1, and it puts the second setting means in the second setting when the head arm 3 is at a position which ensures the predetermined approaching distance, that is, when the head slider 4 exists inside the predetermined doughnut-like area.

If the second setting means is in the first setting when the CPU 10 stops the disk operation, the second drive control means first feeds the negative-polarity VCM current through the voice coil 5 to preliminarily move the head arm 3 in the ID direction, thereby to preliminarily move the head slider 4 to the inside of the above predetermined area, and then reverses the VCM current to the positive polarity to acceleratedly move the head arm 3 in the OD direction and mount it on the ramp 6, whereby the head slider 4 is unloaded to the retract position. Further, if the second setting means is in the second setting, the second drive control means feeds the positive-polarity VCM current without performing the preliminary movement, thereby to unload the head slider 4 to the retract position.

In addition, the unloading in the stopping of the disk operation and the power off retract may share one judging means without separately providing judging means. Further, the preliminary movement may always be performed for the unloading in the stopping of the disk operation, without providing the second judging means and the second setting means.

As described above, in accordance with the disk drive unit of the embodiment of the present invention, by preliminarily moving the head arm 3 in the ID direction and then acceleratedly moving it in the OD direction for unloading, an approaching distance necessary for mounting the head arm 3 on the ramp 6 can be ensured even if the head arm 3 is close to the ramp 6, and thus the head arm 3 can reliably be mounted on the ramp 6 and accordingly the head slider 4 can reliably be unloaded.

Although, in the above embodiment of the present invention, the preliminary movement is performed for unloading for both the power off retract and the stopping of the disk operation, the preliminary movement may be performed for unloading only for the power off retract or the stopping of the disk operation.

As described above, in accordance with the present invention, by preliminarily moving the transducer head in the direction opposite to the unload direction and then accelerating the transducer head in the unload direction of unloading, the transducer head can reliably be unloaded overcoming the energy barrier regardless of the position of the transducer head on the recording medium before unloading, and thus there is an advantage that the reliability of the head mechanism can be increased.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An improved head mechanism control apparatus for controlling the operation of a head mechanism for unloading from recording medium a transducer head for writing information to the recording medium or reading out information therefrom, wherein the improvement comprises:

an unload control unit for controlling the head mechanism so as to preliminarily move said transducer head in a direction opposite to the unload direction and then acceleratedly move said transducer head in the unload direction for unloading from the recording medium.

2. An improved head mechanism control apparatus as set forth in claim 1, wherein said head mechanism comprises a head arm for supporting said transducer head, and a ramp for supporting said head arm when said transducer head is unloaded, and said unload control unit controls said head mechanism so that said head arm preliminarily moves in the direction opposite to the unload direction and then acceleratedly moves in the unload direction to mount on said ramp.

3. An improved head mechanism control apparatus as set forth in claim 1, wherein said head mechanism comprises a head arm for supporting said transducer head, and a voice coil motor for swinging said head arm, and said unload control unit reverses the polarity of the drive current caused to flow through the coil of said voice coil motor thereby to cause said head mechanism to perform said unloading by said preliminary movement.

4. An improved head mechanism control apparatus as set forth in claim 1, wherein said head mechanism and said head mechanism control apparatus are used in a storage device, and said unload control unit causes said head mechanism to perform said unloading by said preliminary movement when the main power supply of said storage device is turned off and/or said storage device stops the operation on said recording medium.

5. An improved head mechanism control apparatus as set forth in claim 4, further comprising:

a setting logic to be put in a first setting or a second setting; and a judging logic for judging whether or not to perform said preliminary movement, and to perform said preliminary movement, putting said setting logic in the first setting, otherwise in the second setting, wherein said unload control unit causes said preliminary movement to be performed if said setting logic is in the first setting when said main power supply is turned off and/or said operation is stopped, and does not cause said preliminary movement to be performed if said setting logic is in the second setting.

6. An improved head mechanism control apparatus as set forth in claim 5,
wherein said judging logic puts said setting logic in the first setting when said transducer head is over the recording medium, and in the second setting when said transducer head is not over the recording medium.

7. An improved head mechanism control apparatus as set forth in claim 5,
wherein said unload control unit drives said head mechanism by using a counterelectromotive force by a spindle motor for rotating the recording medium, and
said judging logic puts said setting logic in the first setting when the rotating speed of said spindle motor is not higher than a predetermined value, and in the second setting when the rotating speed exceeds the predetermined value.

8. An improved head mechanism control apparatus as set forth in claim 4,
wherein said unload control unit has a first unload control unit for performing the unloading of the transducer head when the main power supply of said storage device is turned off, and a second unload control unit for performing the unloading of the transducer head when said operation is stopped,
said first unload control unit or/and said second unload control unit causing said head mechanism to perform said unloading by said preliminary movement.

9. An improved head mechanism control apparatus as set forth in claim 1, wherein said unload control unit further comprises:
a driver unit for driving said head mechanism by applying a drive signal to said head mechanism; and
a drive control unit for controlling said driver unit.

10. An improved head mechanism control apparatus as set forth in claim 9,
wherein said driver unit reverses the drive direction of said head mechanism by reversing the application polarity of said drive signal for said head mechanism, and
said drive control unit controls the reversion timing of said application polarity.

11. An improved head mechanism control apparatus as set forth in claim 9,
wherein said driver unit generates said drive signal from the counterelectromotive force by the spindle motor for rotating the recording medium.

12. A disk drive unit comprising:
a disk recording medium;
a transducer head for writing information onto said disk recording medium or reading out information therefrom;
a head mechanism for unloading said transducer head from said disk recording medium; and
a head mechanism control apparatus for controlling the operation for unloading from said recording mechanism said head mechanism
wherein said head mechanism control apparatus controls the head mechanism so as to preliminarily move said transducer head in a direction opposite the unload direction and then acceleratedly move said transducer head for unloading from the recording medium.

13. A head unload control method for controlling the unloading of a transducer head from a disk recording medium in a disk drive unit having a load/unload mechanism, said method comprising the steps of:
enabling the transducer head to move in a first direction; and
enabling the transducer head to move in a second direction different from said first direction for unloading the transducer head,
whereby the transducer head is unloaded from the disk recording medium.

\* \* \* \* \*